(12) United States Patent
Usami et al.

(10) Patent No.: US 11,015,013 B2
(45) Date of Patent: May 25, 2021

(54) RESIN COMPOSITION, MOLDED BODY, LAMINATE, GAS BARRIER MATERIAL, COATING MATERIAL, AND ADHESIVE

(71) Applicants: DIC Corporation, Tokyo (JP); National Institute of Advanced Industrial Science and Technology, Tokyo (JP)

(72) Inventors: Yusho Usami, Sakura (JP); Tomoaki Harada, Sakura (JP); Michiya Nakashima, Sakura (JP); Takeo Ebina, Sendai (JP); Ryo Ishii, Sendai (JP); Takafumi Aizawa, Sendai (JP)

(73) Assignees: DIC Corporation, Tokyo (JP); National Institute of Advanced Industrial Science and Technology, Tokyo (JP)

( * ) Notice: Subject to any disclaimer, the term of this patent is extended or adjusted under 35 U.S.C. 154(b) by 34 days.

(21) Appl. No.: 16/473,056

(22) PCT Filed: Dec. 19, 2017

(86) PCT No.: PCT/JP2017/045544
§ 371 (c)(1),
(2) Date: Jun. 24, 2019

(87) PCT Pub. No.: WO2018/123734
PCT Pub. Date: Jul. 5, 2018

(65) Prior Publication Data
US 2020/0095366 A1 Mar. 26, 2020

(30) Foreign Application Priority Data
Dec. 26, 2016 (JP) .............................. JP2016-251867

(51) Int. Cl.
| | | |
|---|---|---|
| C08G 18/42 | (2006.01) | |
| C08G 18/80 | (2006.01) | |
| C08G 18/76 | (2006.01) | |
| C08K 3/34 | (2006.01) | |
| C09D 175/06 | (2006.01) | |
| C09D 7/62 | (2018.01) | |
| C09J 11/04 | (2006.01) | |
| B32B 27/36 | (2006.01) | |
| B32B 27/18 | (2006.01) | |
| C09J 175/06 | (2006.01) | |

(52) U.S. Cl.
CPC .......... *C08G 18/4213* (2013.01); *B32B 27/18* (2013.01); *B32B 27/36* (2013.01); *C08G 18/765* (2013.01); *C08G 18/8029* (2013.01); *C08K 3/346* (2013.01); *C09D 7/62* (2018.01); *C09D 175/06* (2013.01); *C09J 11/04* (2013.01); *C09J 175/06* (2013.01)

(58) Field of Classification Search
CPC ............ C08G 18/4213; C08G 18/8029; C08G 18/765; C08K 3/346; C09J 175/06; C09J 11/04; B32B 27/18; B32B 27/36
See application file for complete search history.

(56) References Cited

U.S. PATENT DOCUMENTS 6,774,177 B1 * 8/2004 Wilke ................ C08G 18/0823
427/372.2
2016/0053110 A1 2/2016 Takeda et al.

FOREIGN PATENT DOCUMENTS

| CN | 102448884 A | 5/2012 |
|---|---|---|
| CN | 104870561 A | 8/2015 |
| JP | 2007-277078 A | 10/2007 |
| JP | 2008-247695 A | 10/2008 |
| JP | 2009-107907 A | 5/2009 |
| JP | 2011-051845 A | 3/2011 |
| WO | 2013/027609 A1 | 2/2013 |
| WO | 2014/103994 A1 | 7/2014 |

OTHER PUBLICATIONS

International Search Report dated Apr. 3, 2018, issued for PCT/JP2017/045544.
International Preliminary Report on Patentability dated Jul. 2, 2019 and Written Opinion dated Apr. 3, 2018, issued for PCT/JP2017/045544.
Office Action issued in Chinese Patent Application No. CN 201780080425.X, dated Mar. 2, 2021.

* cited by examiner

*Primary Examiner* — Robert D Harlan
(74) *Attorney, Agent, or Firm* — Locke Lord LLP; James E. Armstrong, IV; Nicholas J. DiCeglie, Jr.

(57) ABSTRACT

A resin composition contains a polyester polyol and a smectite with partially immobilized lithium.

20 Claims, No Drawings

RESIN COMPOSITION, MOLDED BODY, LAMINATE, GAS BARRIER MATERIAL, COATING MATERIAL, AND ADHESIVE

TECHNICAL FIELD

The present invention relates to a resin composition, a molded article, a laminate, a gas barrier material, a coating material, and an adhesive.

BACKGROUND ART

Packaging materials used to package food or similar things are required to have functions such as the protection of their contents, retort resistance, heat resistance, transparency, and workability. To keep the contents in good condition, gas barrier properties are particularly important. Recently, not only packaging materials but also materials for electronic materials, including solar cells and semiconductors, have become required to have high gas barrier properties.

In PTL 1, it is described that combining a resin having a hydroxyl group and an isocyanate compound with a sheet inorganic compound, such as a clay mineral, and a light-screening agent improves gas barrier and other characteristics.

PTL 2 discloses a clay membrane composed of a bentonite with exchangeable lithium or ammonium ions and modified lignin, a lignin modified with polyethylene glycol.

CITATION LIST

Patent Literature

PTL 1: International Publication No. 2013/027609
PTL 2: Japanese Unexamined Patent Application Publication No. 2009-107907

SUMMARY OF INVENTION

Technical Problem

Sheet inorganic compounds of the type described in PTL 1 are bulky, and with such a compound, it is difficult to achieve good compatibility with resins. This means there is a limit to how much such a compound can be added and to its dispersibility. It is therefore difficult to achieve even higher gas barrier properties by adding more of such a compound, and even if it were possible to increase the amount of filler added, dispersibility could not be sufficient, and the gas barrier properties could not be sufficient.

Lignin, used in PTL 2, is a polyphenol of natural origin and varies in structure depending on, for example, the tree species and locality. For use as a material for industrial applications in which consistent quality is required, therefore, lignin has an unresolved disadvantage.

An object of the present invention is therefore to provide a resin composition superior in gas barrier properties, in particular in water vapor barrier properties and in oxygen barrier properties under high-humidity conditions.

Solution to Problem

The inventors found that a smectite with partially immobilized lithium, obtained through prior heat treatment, exhibits improved dispersibility in polyester polyol resins, and as a consequence polyester polyol resins containing such a smectite with partially immobilized lithium as a filler are superior in gas barrier properties (in particular, in water vapor barrier properties and in oxygen barrier properties under high-humidity conditions). Based on these findings, the inventors completed the present invention.

That is, the present invention, in an aspect, provides a resin composition that contains a polyester polyol and a smectite with partially immobilized lithium.

By virtue of the combination of a polyester polyol and a smectite with partially immobilized lithium, the resin composition is superior in gas barrier properties, such as water vapor and oxygen barrier properties. In particular, the resin composition advantageously combines water vapor barrier properties with oxygen barrier properties under high-humidity conditions.

Incidentally, lignin is a polyphenol having a bulky structure and therefore is difficult to fully denature by modification. With the clay membrane in the technology disclosed in PTL 2, made using modified lignin, therefore, waterproofness may be insufficient. This resin composition, by contrast, is likely to provide sufficient waterproofness.

The resin composition may further contain a curing agent, and the curing agent may be a polyisocyanate. In this case, the resin composition combines superior adhesiveness with superior barrier properties.

The polyester polyol may have a hydroxyl value of 20 to 300 mg KOH/g. In this case, the resin composition is superior in suitability for coating purposes and is also superior in adhesiveness when used as an adhesive.

The polyester polyol may be a polycondensate of at least one polyfunctional carboxylic acid that includes at least one of ortho-oriented aromatic dicarboxylic acids and their anhydrides with a polyhydric alcohol. In this case, the resin composition combines superior adhesiveness with superior barrier properties.

The polyester polyol may be a polyester polyol that has a glycerol backbone. This makes the resin composition even better in water vapor and oxygen barrier properties.

The resin composition may further contain a coupling agent. This makes the resin composition even better in water vapor and oxygen barrier properties by helping the smectite with partially immobilized lithium disperse in the resin composition.

The smectite with partially immobilized lithium may have a cation exchange capacity of 1 to 70 meq/100 g. This makes the resin composition even better in water vapor and oxygen barrier properties.

The smectite with partially immobilized lithium may be present in an amount of 3% to 50% by mass based on the total nonvolatile content of the resin composition. This makes the resin composition even better in formability as well as superior in water vapor and oxygen barrier properties.

The present invention, in an aspect, provides an article molded from a resin composition as described above and a laminate having this molded article on a substrate (laminate including a substrate and a molded article).

The resin composition according to an aspect of the present invention is suitable for use in applications such as gas barrier materials, coating materials, and adhesives by virtue of being superior in water vapor and oxygen barrier properties.

Advantageous Effects of Invention

The present invention makes it possible to provide a resin composition superior in water vapor barrier properties and in oxygen barrier properties under high-humidity conditions.

DESCRIPTION OF EMBODIMENTS

The following describes preferred embodiments of the present invention in detail. The present invention, however, is not limited to these embodiments.
<Resin Composition>
A resin composition according to an embodiment contains a polyester polyol and a smectite with partially immobilized lithium.
(Smectite with Partially Immobilized Lithium)
Smectite is a kind of sheet-structured phyllosilicate mineral (sheet clay mineral). Known specific structures of smectite include montmorillonite, beidellite, saponite, hectorite, stevensite, and sauconite. Of these, as the structure(s) of a clay material, at least one selected from the group consisting of montmorillonite and stevensite is preferred. In these structures, a metal element in octahedral sheets has been partially replaced, for example with a lower-valency metal element resulting from isomorphous substitution or with a defect. The octahedral sheets are therefore negatively charged. As a consequence, these structures have vacant sites in their octahedral sheets, and in smectites having these structures, as discussed hereinafter, lithium ions can exist stably after movement.

A smectite in which the retained cation is the lithium ion is referred to as a lithium smectite (Smectites with partially immobilized lithium as described hereinafter are excluded). An example of a method for exchanging a cation in a smectite with the lithium ion is a cation exchange by adding a lithium salt, such as lithium hydroxide or lithium chloride, to a liquid dispersion of a natural sodium smectite. By controlling the amount of lithium added to the liquid dispersion, the quantity of lithium ions in the cation leaching from the resulting lithium smectite can be controlled to an appropriate level. A lithium smectite can alternatively be obtained by a column or batch process that uses a cation-exchange resin that retains lithium ions as a result of ion exchange.

In an embodiment, smectite with partially immobilized lithium refers to a lithium smectite in which a subset of the lithium ions are immobilized in vacant sites in the octahedral sheets. A smectite with partially immobilized lithium is obtained as a result of the immobilization of interlayer lithium ions into vacant sites in the octahedral sheets, for example through the heating of a lithium smectite. The immobilization of lithium ions makes the smectite waterproof.

The temperature conditions for the heating for the partial immobilization of lithium are not critical as long as lithium ions can be immobilized. As discussed hereinafter, a small cation exchange capacity (CEC) will lead to a greater improvement in the water vapor and oxygen barrier properties of the resin composition containing the smectite with partially immobilized lithium. It is therefore preferred to heat the lithium smectite at 150° C. or above in order that the heating will immobilize lithium ions efficiently and thereby reduce the cation exchange capacity greatly. The temperature for the heating is more preferably between 150° C. and 600° C., even more preferably between 180° C. and 600° C., in particular between 200° C. and 500° C., the most preferably between 250° C. and 500° C. Heating at such temperatures ensures higher efficiency in reducing the cation exchange capacity and, at the same time, helps prevent events such as the dehydration of hydroxyl groups in the smectite. The heating is performed preferably in an open electric furnace. This ensures that the relative humidity is 5% or less and the pressure is atmospheric pressure during heating. The duration of the heating is not critical as long as lithium can be partially immobilized, but preferably is between 0.5 and 48 hours, more preferably between 1 and 24 hours, in light of production efficiency.

Whether the resultant substance is a smectite with partially immobilized lithium or not can be determined by x-ray photoelectron spectroscopy (XPS). Specifically, in the XPS spectrum measured by XPS, the position of the binding energy peak attributable to the Li ion is checked. For example, if the smectite is montmorillonite, changing the lithium smectite into a smectite with partially immobilized lithium, for example by heating, will shift the position of the binding energy peak attributable to the Li ion in the XPS spectrum from 57.0 ev to 55.4 ev. If the smectite is montmorillonite, therefore, whether the spectrum has a 55.4-ev binding energy peak is the criterion for whether the smectite is a partially immobilized type or not.

The cation exchange capacity of the smectite with partially immobilized lithium is preferably 70 meq/100 g or less, more preferably 60 meq/100 g or less so that the resin composition will be even better in water vapor and oxygen barrier properties (e.g., oxygen barrier properties under high-humidity conditions). The cation exchange capacity of the smectite with partially immobilized lithium is 1 meq/100 g or more, more preferably 5 meq/100 g or more, even more preferably 10 meq/100 g or more so that the resin composition will be even better in water vapor and oxygen barrier properties (e.g., oxygen barrier properties under high-humidity conditions). In light of these, the cation exchange capacity of the smectite with partially immobilized lithium is between 1 and 70 meq/100 g, more preferably between 5 and 70 meq/100 g, even more preferably between 10 and 60 meq/100 g. If the smectite is montmorillonite, for example, the cation exchange capacity is usually between about 80 and 150 meq/100 g, but partial immobilization will reduce it to between 5 and 70 meq/100 g. The cation exchange capacity of the smectite with partially immobilized lithium may be less than 60 meq/100 g or may even be 50 meq/100 g or less. For example, the cation exchange capacity of the smectite with partially immobilized lithium may be 1 meq/100 g or more and less than 60 meq/100 g, may be 5 meq/100 g or more and less than 60 meq/100 g, or may be 10 meq/100 g or more and less than 60 meq/100 g.

The cation exchange capacity of a smectite can be measured by a method based on Schollenberger's process (the Third Edition of the Handbook of Clays and Clay Minerals, edited by the Clay Science Society of Japan, May 2009, pp. 453-454). More specifically, it can be measured by the method set forth in Japan Bentonite Association Standard test method JBAS-106-77.

The cation leaching from a smectite can be calculated by leaching interlayer cations in the smectite using 100 mL of 1 M aqueous solution of ammonium acetate per 0.5 g of smectite over at least 4 hours and measuring the concentrations of cations in the resulting solution, for example by ICP emission spectrometry or atomic absorption spectrometry.

The amount of the smectite with partially immobilized lithium is preferably 3% by mass or more of the total nonvolatile content of the resin composition. If the amount of the smectite with partially immobilized lithium is 3% by mass or more of the total nonvolatile content, the resin composition is even better in water vapor and oxygen barrier properties (e.g., oxygen barrier properties under high-humidity conditions). In the same light, it is more preferred that the amount of the smectite with partially immobilized lithium be 5% by mass or more, even more preferably 7% by mass or more, in particular 10% by mass or more of the total nonvolatile content of the resin composition. The amount of the smectite with partially immobilized lithium is preferably 50% by mass or less of the total nonvolatile content of the resin composition. If the amount of the smectite with partially immobilized lithium is 50% by mass or less, the resin composition is even better in formability and is improved in adhesion to a substrate. The oxygen barrier properties under high-humidity conditions also become higher. In the same light, it is more preferred that the amount of the smectite with partially immobilized lithium be 45% by mass or less, even more preferably 40% by mass or less, further preferably 35% by mass or less, in particular 20% by mass or less of the total nonvolatile content of the resin composition. To summarize, the amount of the smectite with partially immobilized lithium is preferably between 3% and 50% by mass, more preferably between 5% and 35% by mass, even more preferably between 7% and 20% by mass of the total nonvolatile content of the resin composition. The nonvolatile content is defined as the mass that is left after subtracting the mass of diluents and the mass of volatile components in the polyester polyol, in curing agents, in modifiers, and in additives from the total mass of the resin composition.

<Polyester Polyol>

The polyester polyol can be of any kind, but preferably the hydroxyl value of the polyester polyol is 20 mg KOH/g or more, preferably 300 mg KOH/g or less. The polyester polyol is therefore preferably a polyester polyol whose hydroxyl value falls within the range of 20 to 300 mg KOH/g. A hydroxyl value equal to or higher than 20 mg KOH/g is likely to result in good suitability for coating purposes because the resin composition would be of low viscosity owing to its molecular weight in a proper range. A hydroxyl value equal to or lower than 300 mg KOH/g is likely to result in good adhesive strength because the crosslink density of the cured coating would be appropriate. The acid value of the polyester polyol is preferably 200 mg KOH/g or less. An acid value equal to or lower than 200 mg KOH/g tends to result in good suitability for coating purposes because the polyester polyol would not react with a polyisocyanate too fast. The hydroxyl value can be measured by the measuring method for hydroxyl value set forth in JIS-K0070. The acid value can be measured by the measuring method for acid value set forth in JIS-K0070.

A polyester polyol in an embodiment may be a reaction product obtained through reaction (e.g., polycondensation) between a polyfunctional carboxylic acid and a polyhydric alcohol (polycondensate). In other words, the polyester polyol may have a structural unit derived from a polyfunctional carboxylic acid and a structural unit derived from a polyhydric alcohol. If the polyester polyol is a polycondensate of a polyfunctional carboxylic group with a polyhydric alcohol, the hydroxyl value of the polyester polyol can be adjusted to a desired range, for example by changing the proportions of the polyfunctional carboxylic acid and polyhydric alcohol.

The polyfunctional carboxylic acid can be of any kind. For example, it can be an aliphatic polyfunctional carboxylic acid, a polyfunctional carboxylic acid containing an unsaturated bond, an alicyclic polyfunctional carboxylic acid, or an aromatic polyfunctional carboxylic acid. Examples of aliphatic polyfunctional carboxylic acids include succinic acid, adipic acid, azelaic acid, sebacic acid, and dodecanedicarboxylic acid. Examples of polyfunctional carboxylic acids containing an unsaturated bond include maleic anhydride, maleic acid, and fumaric acid. Examples of alicyclic polyfunctional carboxylic acids include 1,3-cyclopentanedicarboxylic acid, 1,4-cyclohexanedicarboxylic acid, and 4-methylhexahydrophthalic anhydride. Examples of aromatic polyfunctional carboxylic acids include orthophthalic acid, terephthalic acid, isophthalic acid, pyromellitic acid, trimellitic acid, 1,4-naphthalenedicarboxylic acid, 2,5-naphthalenedicarboxylic acid, 2,6-naphthalenedicarboxylic acid, naphthalic acid, biphenyldicarboxylic acid, and 1,2-bis(phenoxy)ethane-p,p'-dicarboxylic acid and anhydrides or ester-forming derivatives of these dicarboxylic acids; polybasic acids, such as p-hydroxybenzoic acid and p-(2-hydroxyethoxy)benzoic acid and ester-forming derivatives of these dihydroxycarboxylic acids, and anhydrides thereof. These polyfunctional carboxylic acids can be used alone, or two or more can be used in combination.

Of these polyfunctional carboxylic acids, at least one polyfunctional carboxylic acid that includes at least one of ortho-oriented aromatic dicarboxylic acids and their anhydrides is particularly preferred because it helps further improve barrier properties and because the use of it results in superior adhesive strength combined with superior oxygen barrier properties. Examples of ortho-oriented aromatic dicarboxylic acids and their anhydrides include orthophthalic acid and 1,2-phenylenediacetic acid. The framework of an ortho-oriented aromatic compound is an asymmetric structure. If made with at least one of ortho-oriented aromatic dicarboxylic acids and their anhydrides, therefore, the polyester polyol is formed presumably with restricted rotation of its molecular chains, and this presumably helps further improve oxygen barrier properties. This asymmetric structure, moreover, causes the resulting polyester polyol to be amorphous. The resultant flexibility near room temperature (e.g., 25° C.) and improved conformance to a curved substrate renders the resin composition sufficiently adhesive to substrates, and this presumably gives the resin composition superior adhesive strength combined with superior oxygen barrier properties. Furthermore, ortho-oriented aromatic dicarboxylic acids and their anhydrides are capable of giving the resin composition the character of superior ease of handling because they are high in solubility in solvents, an ability that is essential if the resin composition is used as a dry lamination adhesive. Industrially, orthophthalic acid and its acid anhydride are more preferred because they are easily available.

The percentage of structural units derived from ortho-oriented aromatic dicarboxylic acids and their anhydrides in all structural units derived from polyfunctional carboxylic acids is preferably 50% by mass or more, more preferably 70% by mass or more so that higher barrier properties will be obtained. The percentage of structural units derived from ortho-oriented aromatic dicarboxylic acids and their anhydrides in all structural units derived from polyfunctional carboxylic acids is preferably 100% by mass or less so that higher barrier properties will be obtained. In light of these, the percentage of structural units derived from ortho-oriented aromatic dicarboxylic acids and their anhydrides in all structural units derived from polyfunctional carboxylic acids is preferably between 50% and 100% by mass, more preferably between 70% and 100% by mass. If the polyester polyol is produced using at least one of ortho-oriented aromatic dicarboxylic acids and their anhydrides as polyfunctional carboxylic acid(s), therefore, loading amount of ortho-oriented aromatic dicarboxylic acids and their anhydrides is preferably between 50% and 100% by mass, more preferably between 70% and 100% by mass of the entire polyfunctional carboxylic acid component so that the resin composition will exhibit high barrier properties.

The polyhydric alcohol can be of any kind; known and commonly used materials can be used. Examples of polyhydric alcohols include compounds like aliphatic diols and aromatic polyhydric phenols, versions thereof extended with ethylene oxide, and hydrogenated alicyclic compounds. One polyhydric alcohol can be used alone, or multiple polyhydric alcohols can be used in combination.

Examples of aliphatic diols include ethylene glycol, propylene glycol, butylene glycol, neopentyl glycol, cyclohexanedimethanol, 1,5-pentanediol, 3-methyl-1,5-pentanediol, 1,6-hexanediol, methylpentanediol, dimethylbutanediol, butylethylpropanediol, diethylene glycol, triethylene glycol, tetraethylene glycol, dipropylene glycol, and tripropylene glycol.

Examples of aromatic polyhydric phenols include hydroquinone, resorcinol, catechol, naphthalenediol, biphenol, bisphenol A, bisphenol F, and tetramethylbiphenol.

In order for barrier properties to be further improved, at least one selected from the group consisting of ethylene glycol, propylene glycol, butylene glycol, neopentyl glycol, and cyclohexanedimethanol is preferred. Among these, ethylene glycol in particular is more preferred because it gives better oxygen barrier properties. Ethylene glycol contributes to superior barrier properties presumably because its molecular chains are not excessively flexible owing to few carbon atoms between the oxygen atoms.

A polyester polyol in an embodiment may have a branched structure. A polyester polyol having a branched structure makes the resin composition even better in water vapor and oxygen barrier properties because by increasing the density of its polymer chains, the gaps through which oxygen and other gases can pass can be reduced.

If the polyester polyol is a polycondensate of a polyfunctional carboxylic acid with a polyhydric alcohol, the use of at least one of a polyfunctional carboxylic acid that is trifunctional or has more carboxylic groups and a polyhydric alcohol that is trihydric or has more hydroxyl groups will result in a polyester polyol having a branched structure.

Examples of polyfunctional carboxylic acids that are trifunctional or have more carboxylic groups include trimellitic acid and its acid anhydride and pyromellitic acid and its acid anhydride. When it comes to preventing gelation during synthesis, trifunctional carboxylic acids are preferred.

Examples of polyhydric alcohols that are trifunctional or have more hydroxyl groups include glycerol, trimethylolpropane, trimethylolethane, tris(2-hydroxyethyl)isocyanurate, 1,2,4-butanetriol, pentaerythritol, and dipentaerythritol. When it comes to preventing gelation during synthesis, trihydric alcohols are preferred.

More specific examples of polyester polyols according to an embodiment include:
Polyester polyols obtained by reacting a polyester polyol having three or more hydroxyl groups with a polyfunctional carboxylic anhydride or polyfunctional carboxylic acid (A1),
Polyester polyols having a polymerizable carbon-carbon double bond (A2),
Polyester polyols having a glycerol backbone (A3),
Polyester polyols obtained by polycondensing an ortho-oriented polyfunctional carboxylic acid component with a polyhydric alcohol component (A4), and
Polyester polyols having an isocyanuric ring (A5). Polyester polyols (A1) are in other words polycondensates of a polyester polyol having three or more hydroxyl groups with a polyfunctional carboxylic anhydride or polyfunctional carboxylic acid. Polyester polyols (A4) are in other words polycondensates of an ortho-oriented polyfunctional carboxylic acid component with a polyhydric alcohol component.

Of these polyester polyols, polyester polyols (A3) and polyester polyols (A4) are particularly preferred, and polyester polyols (A4) are more preferred. It is particularly preferred to use a polyester polyol (A3) and a polyester polyol (A4) in combination, specifically a polyester polyol that has a glycerol backbone and is obtained by polycondensing an ortho-oriented polyfunctional carboxylic acid component with a polyhydric alcohol component (glycerol-backbone polycondensate of an ortho-oriented polyfunctional carboxylic acid component with a polyhydric alcohol component). The following describes each type of polyester polyol.

[Polyester Polyols (A1)]

A polyester polyol (A1) preferably has at least one carboxyl group and two or more hydroxyl groups.

The polyester polyol having three or more hydroxyl groups as a component of a polyester polyol (A1) can be obtained using a polyfunctional carboxylic acid that is trifunctional or has more carboxylic groups and/or a polyhydric alcohol that is trihydric or has more hydroxyl groups. The polyester polyol having three or more hydroxyl groups is preferably a polycondensate of a polyfunctional carboxylic acid component that includes at least one selected from the group consisting of orthophthalic acid and its anhydride with a polyhydric alcohol component that includes at least one selected from the group consisting of ethylene glycol, propylene glycol, butylene glycol, neopentyl glycol, and cyclohexanedimethanol (polyester polyol (I)).

A preferred polyester polyol (A1) is a polycondensate of a polyester polyol (I) with a polyfunctional carboxylic anhydride or polyfunctional carboxylic acid and one having at least one carboxyl group and two or more hydroxyl groups.

A polyester polyol (A1) can be obtained by, for example, reacting at least one of a polyfunctional carboxylic acid and its anhydride with the hydroxyl groups of a polyester polyol (I). It is preferred to adjust the proportions of the polyester polyol (I) and the polyfunctional carboxylic acid so that the polyfunctional carboxylic acid will react with ⅓ or less of the hydroxyl groups of the polyester polyol (I) to ensure that the resulting polyester polyol (A1) will have two or more hydroxyl groups. The polyfunctional carboxylic acid and anhydride thereof used here can be of any kind, but given the gelation during the reaction between the polyfunctional carboxylic acid and the polyester polyol (I), it is preferred to use a bifunctional or trifunctional carboxylic anhydride. For use as the bifunctional carboxylic anhydride, anhydrides such as succinic anhydride, maleic anhydride, 1,2-cyclohexanedicarboxylic anhydride, 4-cyclohexene-1,2-dicarboxylic anhydride, 5-norbornene-2,3-dicarboxylic anhydride, phthalic anhydride, and 2,3-naphthalenedicarboxylic anhydride are preferred. For use as the trifunctional carboxylic anhydride, anhydrides such as trimellitic anhydride are preferred.

[Polyester Polyols (A2)]

A polyester polyol (A2) is obtained by reacting a polyfunctional carboxylic acid and a polyhydric alcohol. The use of component(s) having a polymerizable carbon-carbon double bond as at least one of the polyfunctional carboxylic acid and polyhydric alcohol components results in a polyester polyol having a polymerizable carbon-carbon double bond in its molecule (A2).

Examples of polyfunctional carboxylic acids that have a polymerizable carbon-carbon double bond include maleic anhydride, maleic acid, fumaric acid, 4-cyclohexene-1,2-dicarboxylic acid and its acid anhydride, and 3-methyl-4-cyclohexene-1,2-dicarboxylic acid and its anhydride. Among these, at least one selected from the group consisting of maleic anhydride, maleic acid, and fumaric acid is preferred owing to their being superior in oxygen barrier properties. These polyfunctional carboxylic acids contribute to superior barrier properties presumably because their molecular chains are not excessively flexible owing to few carbon atoms between the oxygen atoms.

An example of a polyhydric alcohol that has a polymerizable carbon-carbon double bond is 2-butene-1,4-diol.

A polyester polyol (A2) may be a polycondensate of a polyester polyol having a hydroxyl group with a polyfunctional carboxylic acid having a polymerizable carbon-carbon double bond and/or its anhydride. The polyfunctional carboxylic acid in this case can be, for example, a carboxylic acid that has a polymerizable carbon-carbon double bond, such as maleic acid, maleic anhydride, or fumaric acid, or an unsaturated fatty acid, such as oleic acid or sorbic acid. The polyester polyol in this case is preferably a polyester polyol that has two or more hydroxyl groups. Given the elongation of molecules resulting from crosslinking with an isocyanate compound, a polyester polyol having three or more hydroxyl groups is more preferred. A polyester polyol having three or more hydroxyl groups ensures that the resulting polyester polyol (A2), obtained by reacting the polyester polyol with a carboxylic acid having a polymerizable carbon-carbon double bond, will have two or more hydroxyl groups. The elongation of molecules caused by the reaction of a curing agent, which is described hereinafter, becomes more likely to occur, helping the resin composition have characteristics for use as an adhesive, such as lamination strength, seal strength, and heat resistance.

The amount of monomer components having a polymerizable carbon-carbon double bond is preferably between 5 and 60 parts by mass based on all monomer components of the polyester polyol (A2) as 100 parts by mass. An amount in this range is likely to result in high barrier properties because there are sufficient crosslink junctions between polymerizable carbon-carbon double bonds. Such an amount, moreover, ensures that the cured coating will be higher in characteristics like lamination strength because it will be able to maintain its flexibility.

The amount of monomer components having a polymerizable carbon-carbon double bond in a polyester polyol (A2) (percentage of double-bond components) is determined by a calculation using equation (a) below. In equation (a) below, the monomers refer to the polyfunctional carboxylic acid and polyhydric alcohol.

Percentage of double-bond components=[Mass of double-bond components (monomers)]/[Mass of all components (monomers)]×100 (a)

Examples of polyester polyols (A2) include drying oils and semidrying oils.

[Polyester Polyols (A3)]

Specific examples of polyester polyols (A3) include polyester polyols that have a glycerol backbone represented by general formula (1) below. A polyester polyol having a glycerol backbone, in particular a glycerol backbone represented by general formula (1) below, makes the resin composition even better in water vapor and oxygen barrier properties.

[Chem. 1]

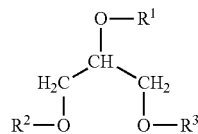

(1)

(In formula (1), $R^1$, $R^2$, and $R^3$ each independently represent a hydrogen atom or a group represented by general formula (2) below

[Chem. 2]

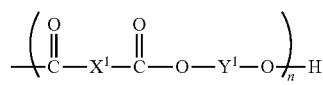

(2)

(In formula (2), n represents an integer of 1 to 5, $X^1$ represents an arylene group selected from the group consisting of the 1,2-phenylene, 1,2-naphthylene, 2,3-naphthylene, 2,3-anthraguinonediyl, and 2,3-anthracenediyl groups, whether substituted or unsubstituted, and $Y^1$ represents a C2-6 alkylene group), with the proviso that at least one of $R^1$, $R^2$, and $R^3$ represents a group represented by general formula (2).

In general formula (1) above, it is preferred that all of $R^1$, $R^2$, and $R^3$ be groups represented by general formula (2) above.

It may be that any two or more of the following compounds are in a mixture: a compound in which any one of $R^1$, $R^2$, and $R^3$ is a group represented by general formula (2) above, a compound in which any two of $R^1$, $R^2$, and $R^3$ are groups represented by general formula (2) above, and a compound in which all of $R^1$, $R^2$, and $R^3$ are groups represented by general formula (2) above are in a mixture.

If $X^1$ is substituted, it may be substituted with one or multiple substituents. The substituent(s) is bound to any carbon atom(s) on $X^1$ other than the free radicals. The substituent(s) can be, for example, chloro, bromo, methyl, ethyl, i-propyl, hydroxyl, methoxy, ethoxy, phenoxy, methylthio, phenylthio, cyano, nitro, amino, phthalimide, carboxyl, carbamoyl, N-ethylcarbamoyl, phenyl, or naphthyl group(s).

In general formula (2) above, $Y^1$ represents a C2-6 alkylene group, such as the ethylene, propylene, butylene, neopentylene, 1,5-pentylene, 3-methyl-1,5-pentylene, 1,6-hexylene, methylpentylene, or dimethylbutylene group. Among these, the propylene and ethylene groups are particularly preferred, and the ethylene group is the most preferred.

A polyester resin compound that has a glycerol backbone represented by general formula (1) above (polyester polyol (A3)) can be obtained by reacting glycerol, an aromatic polyfunctional carboxylic acid with substitution of carboxylic acid in ortho positions and/or its anhydride, and a polyhydric alcohol component as essential components. In other words, a polyester polyol (A3) that has a glycerol backbone represented by general formula (1) above may be a polycondensate of glycerol, an aromatic polyfunctional carboxylic acid with substitution of carboxylic acid in ortho positions and/or its anhydride, a polyhydric alcohol component, and any other optional component.

Examples of aromatic polyfunctional carboxylic acids with substitution of carboxylic acid in ortho positions and their anhydrides include orthophthalic acid and its anhydride, naphthalene 2,3-dicarboxylic acid and its anhydride, naphthalene 1,2-dicarboxylic acid and its anhydride, anthraquinone 2,3-dicarboxylic acid and its anhydride, and 2,3-anthracenecarboxylic acid and its anhydride. These compounds may have a substituent on any carbon atom in their aromatic ring(s). The substituent can be, for example, a chloro, bromo, methyl, ethyl, i-propyl, hydroxyl, methoxy, ethoxy, phenoxy, methylthio, phenylthio, cyano, nitro, amino, phthalimide, carboxyl, carbamoyl, N-ethylcarbamoyl, phenyl, or naphthyl group.

The polyhydric alcohol component can be, for example, a C2-6 alkylene diol. Examples include diols such as ethylene glycol, propylene glycol, butylene glycol, neopentyl glycol, 1,5-pentanediol, 3-methyl-1,5-pentanediol, 1,6-hexanediol, methylpentanediol, and dimethylbutanediol.

The amount of the glycerol backbone is determined by calculating, using equation (b) below, how much the residue in general formula (1) above excluding $R^1$, $R^2$, and $R^3$ ($C_3H_5O_3$=89.07) is in the total solids mass of the resin composition.

Amount of the glycerol backbone={[The number of moles of the glycerol backbone per mole of P×89.07)/(Number-average molecular weight of P)]×(Mass of P used)/(Total solids mass of the resin composition)}×100    (b)

P: Represents the polyester polyol (A3).

If a polyester polyol (A3) is used, the amount of the glycerol backbone in the resin composition is preferably 5% by mass or more of the total solids mass of the resin composition so that the resin composition will exhibit high barrier properties.

[Polyester Polyols (A4)]

The ortho-oriented polyfunctional carboxylic acid component as a component of a polyester polyol (A4) is preferably an ortho-oriented aromatic dicarboxylic acid and/or its anhydride, more preferably orthophthalic acid and/or its anhydride. That is, a polyester polyol (A4) is preferably a polycondensate of at least one polyfunctional carboxylic acid that includes at least one of an ortho-oriented aromatic dicarboxylic acid and its anhydride with a polyhydric alcohol, more preferably a polycondensate of at least one polyfunctional carboxylic acid that includes at least one of orthophthalic acid and its anhydride with a polyhydric alcohol. Such a polyester polyol (A4) incorporates, for example, a polyfunctional carboxylic acid component that includes at least one orthophthalic acid and anhydride thereof and a polyhydric alcohol component that includes at least one selected from the group consisting of ethylene glycol, propylene glycol, butylene glycol, neopentyl glycol, and cyclohexanedimethanol as structural units. In particular, polyester polyols in which the percentage of structural units of the aforementioned orthophthalic acid and anhydride thereof based on the entire polyfunctional carboxylic acid component is between 50% and 100% by mass are preferred.

[Polyester Polyols (A5)]

For polyester polyols (A5), it would be more preferred that the resin composition contain a polyester polyol (A5) that has an isocyanuric ring represented by general formula (3) below.

[Chem. 3]

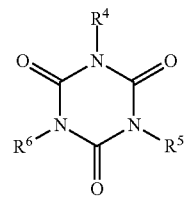

(3)

(In general formula (3), $R^4$, $R^5$, and $R^6$ each independently represent $-(CH_2)_{n1}-OH$ (n1 represents an integer of 2 to 4.) or a group represented by general formula (4) below

[Chem. 4]

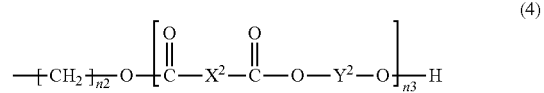

(4)

(In general formula (4), n2 represents an integer of 2 to 4, n3 represents an integer of 1 to 5, $X^2$ represents an arylene group, whether substituted or unsubstituted, selected from the group consisting of the 1,2-phenylene, 1,2-naphthylene, 2,3-naphthylene, 2,3-anthraquinonediyl, and 2,3-anthracenediyl groups, and $Y^2$ represents a C2-6 alkylene group), with the proviso that at least one of $R^4$, $R^5$, and $R^6$ represents a group represented by general formula (4) above.)

In general formula (3), an alkylene group represented by $-(CH_2)_{n1}-$ may be linear or branched. n1 is preferably 2 or 3, the most preferably 2.

In general formula (4), n2 represents an integer of 2 to 4, and n3 represents an integer of 1 to 5.

If $X^2$ is substituted, it may be substituted with one or multiple substituents. The substituent(s) is bound to any carbon atom(s) on $X^2$ other than the free radicals. The substituent(s) can be, for example, chloro, bromo, methyl, ethyl, i-propyl, hydroxyl, methoxy, ethoxy, phenoxy, methylthio, phenylthio, cyano, nitro, amino, phthalimide, carboxyl, carbamoyl, N-ethylcarbamoyl, phenyl, or naphthyl group(s).

Of these, it is particularly preferred that the substituent(s) of $X^2$ be at least one selected from the group consisting of hydroxyl, cyano, nitro, amino, phthalimide, carbamoyl, N-ethylcarbamoyl, and phenyl groups, the most preferably at least one selected from the group consisting of hydroxyl, phenoxy, cyano, nitro, phthalimide, and phenyl groups.

In general formula (4), $Y^2$ represents a C2-6 alkylene group, such as the ethylene, propylene, butylene, neopentylene, 1,5-pentylene, 3-methyl-1,5-pentylene, 1,6-hexylene, methylpentylene, or dimethylbutylene group. Among these, the propylene and ethylene groups are particularly preferred, and the ethylene group is the most preferred.

In general formula (3) above, it is preferred that all of $R^4$, $R^5$ and $R^6$ be groups represented by general formula (4) above.

It may be that any two or more of the following compounds are in a mixture: a compound in which any one of $R^4$, $R^5$, and $R^6$ is a group represented by general formula (4) above, a compound in which any two of $R^4$, $R^5$, and $R^6$ are groups represented by general formula (4) above, and a compound in which all of $R^4$, $R^5$, and $R^6$ are groups represented by general formula (4) above.

A polyester polyol (A5) that has an isocyanuric ring represented by general formula (3) above can be obtained by reacting a triol having an isocyanuric ring, an aromatic polyfunctional carboxylic acid with substitution of carboxylic acid in ortho positions and/or its anhydride, and a polyhydric alcohol component as essential components. In other words, a polyester polyol (A5) that has an isocyanuric ring represented by general formula (3) above may be a polycondensate of a triol having an isocyanuric ring, an aromatic polyfunctional carboxylic acid with substitution of carboxylic acid in ortho positions and/or its anhydride, a polyhydric alcohol component, and any other optional component.

Examples of triols that have an isocyanuric ring include alkylene oxide adducts of isocyanuric acid, such as 1,3,5-tris(2-hydroxyethyl)isocyanuric acid and 1,3,5-tris(2-hydroxypropyl) isocyanuric acid.

Examples of aromatic polyfunctional carboxylic acids with substitution of carboxylic acid in ortho positions and their anhydrides include orthophthalic acid and its anhydride, naphthalene 2,3-dicarboxylic acid and its anhydride, naphthalene 1,2-dicarboxylic acid and its anhydride, anthraquinone 2,3-dicarboxylic acid and its anhydride, and 2,3-anthracenecarboxylic acid and its anhydride. These compounds may have a substituent on any carbon atom in their aromatic ring(s). The substituent can be, for example, a chloro, bromo, methyl, ethyl, i-propyl, hydroxyl, methoxy, ethoxy, phenoxy, methylthio, phenylthio, cyano, nitro, amino, phthalimide, carboxyl, carbamoyl, N-ethylcarbamoyl, phenyl, or naphthyl group.

The polyhydric alcohol component can be, for example, a C2-6 alkylene diol. Examples include diols such as ethylene glycol, propylene glycol, butylene glycol, neopentyl glycol, 1,5-pentanediol, 3-methyl-1,5-pentanediol, 1,6-hexanediol, methylpentanediol, and dimethylbutanediol.

In particular, polyester polyols obtained using 1,3,5-tris (2-hydroxyethyl)isocyanuric acid/or and 1,3,5-tris(2-hydroxypropyl)isocyanuric acid as triol compound(s) having an isocyanuric ring, orthophthalic anhydride as the aromatic polyfunctional carboxylic acid with substitution of carboxylic acid in ortho positions and/or anhydride thereof, and ethylene glycol as a polyhydric alcohol (polyester polyol compounds having an isocyanuric ring) are preferred in that the resin composition will be particularly superior in oxygen barrier properties and adhesiveness.

An isocyanuric ring is highly polar and trifunctional. By using a polyester polyol (A5), therefore, it is possible to make the entire system highly polarized and also to increase the crosslink density. In such lights, it is preferred that the amount of the isocyanuric ring in the polyester polyol (A5) be 5% by mass or more of the total solids content of the resin.

Regarding the reason why oxygen barrier properties and dry lamination adhesiveness can be guaranteed with a resin composition that contains a polyester polyol having an isocyanuric ring (A5) (e.g., an adhesive containing such a resin composition), the inventors speculate as follows.

An isocyanuric ring is highly polar and forms no hydrogen bonds. The addition of a highly polar functional group, such as the hydroxyl group, urethane linkage, ureido linkage, or amide linkage, is a generally known way to enhance adhesiveness, but resins having these linkages easily form intermolecular hydrogen bonds and therefore can occasionally affect solubility in solvents that are contained in dry lamination adhesives (ethyl acetate, 2-butanone solvent, etc.). By contrast, polyester polyols having an isocyanuric ring are easy to dilute because they do not affect such solubility. Moreover, since an isocyanuric ring is trifunctional, a polyester polyol with an isocyanuric ring as the center of its polymer backbone and having particular polyester structure(s) in its branches provides a high crosslink density. By increasing the crosslink density, presumably, the gaps through which oxygen and other gases can pass can be reduced. In this way, an isocyanuric ring forms no intermolecular hydrogen bonds, is highly polar, and provides a high crosslink density. As a consequence, the inventors speculate, oxygen barrier properties and dry lamination adhesiveness can be guaranteed with a resin composition that contains a polyester polyol having an isocyanuric ring (A5).

The amount of the isocyanuric ring can be determined by calculating, using equation (c) below, how much the residue in general formula (3) above excluding $R^4$, $R^5$, and $R^6$ ($C_3N_3O_3$=126.05) is in the total solids mass of the resin composition.

$$\text{Amount of the isocyanuric ring} = \{[(\text{The number of moles of the isocyanuric ring per mole of } P \times 126.05)/(\text{Number-average molecular weight of } P)] \times (\text{Mass of } P \text{ used})/(\text{Total solids mass of the resin composition})\} \times 100 \quad (c)$$

P: Represents the polyester polyol having an isocyanuric ring (A5).

[Calculation of the Total Solids Mass of the Resin Composition]

The mass left after subtracting the mass of diluents, the mass of volatile components in curing agents, and inorganic components from the total mass of the resin component is defined as the total solids mass of the resin composition in the resin composition.

[Production of the Polyester Polyol]

A polyester polyol in an embodiment can be obtained by known methods for producing polyester, such as reacting a polyfunctional carboxylic acid and/or its anhydride with a polyhydric alcohol. Specifically, it can be synthesized by a production method in which the materials are allowed to react in the presence of a catalyst at a reaction temperature of 200° C. to 220° C. while the water produced is removed out of the system.

The following is a specific example. First, the polyfunctional carboxylic acid and/or anhydride thereof and the polyhydric alcohol to be used as the raw materials are added in a batch and then heated with mixing by stirring to undergo dehydration condensation. Then, the reaction is continued until the acid value as obtained by the measuring method for acid value set forth in JIS-K0070 is 1 mg KOH/g or less and until the hydroxyl value Z mg KOH/g as obtained by the measuring method for hydroxyl value set forth in the same JIS-K0070 is within ±5% of the value on the right side of equation (d) below (mg KOH/g). In this way, a desired polyester polyol can be obtained.

$$Z = 3/[(\text{Molecular weight of potassium hydroxide}) \times 1000 \times Mn] \quad (d)$$

(In equation (d), Mn represents the target number-average molecular weight of the desired polyester polyol.)

In a method for producing a polyester polyol according to an embodiment, the raw materials may be allowed to react stepwise. The polyol component vaporized at the reaction temperature may be added during preparation so that the hydroxyl value will fall within ±5%.

The catalyst used for the reaction can be, for example, an acid catalyst. Examples include tin catalysts, such as monobutyltin oxide and dibutyltin oxide, titanium catalysts, such as tetra-isopropyl-titanate and tetra-butyl-titanate, and zirconia catalysts, such as tetra-butyl-zirconate. The titanium catalysts, such as such as tetra-isopropyl-titanate or tetra-butyl-titanate, and the zirconia catalysts are highly active toward esterification, and it is preferred to use these types of catalysts in combination. As for the amount of the catalyst, the catalyst is used in between 1 and 1000 ppm of the total mass of the reactants used, more preferably between 10 and 100 ppm. This is because using a catalyst in an amount of 1 ppm or more helps it produce its catalytic effect, and in an amount of 1000 ppm or less, the catalyst is unlikely to affect the secondary reaction.

The number-average molecular weight of the polyester polyol is preferably between 350 and 6000 because this results in such a crosslink density that makes the resin composition well-balanced between adhesive and oxygen barrier potentials. It is particularly preferred that the number-average molecular weight be between 450 and 5000. The number-average molecular weight of the polyester polyol is measured as described in EXAMPLES.

The glass transition temperature of a polyester polyol in an embodiment preferably falls within the range of −30° C. to 80° C. A glass transition temperature of 80° C. or lower ensures that the resin composition is superior in formability and adhesion because with such a glass transition temperature the polyester polyol is high in flexibility. A glass transition temperature of −30° C. or higher results in satisfactory oxygen barrier properties because with such a glass transition temperature the molecular motion of the polyester polyol near ordinary temperature (e.g., 25° C.) is unlikely to be strong. The glass transition temperature is more preferably between −25° C. and 60° C.

(Curing Agent)

A resin composition according to an embodiment may further contain a curing agent that reacts with the polyester polyol. Any kind of curing agent can be used as long as it is a curing agent that can react with the hydroxyl groups of the polyester polyol and/or any carboxylic acid remaining in part of the polyester polyol; polyisocyanates, epoxy compounds, and other known curing agents can be used. One curing agent may be used alone, or multiple curing agents may be used in combination.

The curing agent is preferably a polyisocyanate in light of adhesiveness and retort resistance. Polyisocyanates provide an adequate duration of reaction and make the resin composition particularly superior in adhesive strength and oxygen barrier properties. The crosslink density in this case preferably falls within the range of 0.4 to 4.5 mmol/g. The concentration of urethane groups in this case preferably falls within the range of 1.0 to 6.0 mmol/g.

The polyisocyanate may be any of an aromatic polyisocyanate and an aliphatic polyisocyanate, may be a diisocyanate or polyisocyanate that is trifunctional or has more isocyanate groups, and may be a low-molecular-weight or high-molecular-weight compound. For example, the polyisocyanate may be tetramethylene diisocyanate, hexamethylene diisocyanate, toluene diisocyanate, diphenylmethane diisocyanate, hydrogenated diphenylmethane diisocyanate, xylylene diisocyanate, hydrogenated xylylene diisocyanate, or isophorone diisocyanate, may be a trimer of any such diisocyanate, and may be a compound containing terminal diisocyanate groups obtained by reacting an excess of any such diisocyanate and a low-molecular-weight active hydrogen compound, high-molecular-weight active hydrogen compound, or similar compound. Examples of low-molecular-weight active hydrogen compounds include ethylene glycol, propylene glycol, trimethylolpropane, glycerol, sorbitol, ethylenediamine, monoethanolamine, diethanolamine, and triethanolamine. Examples of high-molecular-weight active hydrogen compounds include polyester polyols, polyether polyols, and polyamides.

The polyisocyanate may be a blocked polyisocyanate (polyisocyanate blocked with a blocking agent). A blocked polyisocyanate can be obtained by subjecting a polyisocyanate as described above and an isocyanate blocking agent to addition reactions by an appropriate known method. Examples of isocyanate blocking agents include phenolic compounds, such as phenol, thiophenol, methyl thiophenol, ethyl thiophenol, cresol, xylenol, resorcinol, nitrophenol, and chlorophenol, oximes, such as acetoxime, methyl ethyl ketoxime, and cyclohexanone oxime, alcohols, such as methanol, ethanol, propanol, and butanol, halogenated alcohols, such as ethylene chlorohydrin and 1,3-dichloro-2-propanol, tertiary alcohols, such as t-butanol and t-pentanol, and lecterns, such as ε-caprolactam, δ-valerolactam, γ-butyrolactam, and β-propiolactam. Compounds like aromatic amines, imides, acetylacetone, active methylene compounds such as acetoacetic esters and ethyl malonate, mercaptans, imines, urea compounds, diaryl compounds, and sodium bisulfite are also examples of isocyanate blocking agents.

Among these, xylylene diisocyanate and hydrogenated xylylene diisocyanate are particularly preferred, and meta-xylylene diisocyanate and meta-hydrogenated xylylene diisocyanate are the most preferred.

If carboxylic acid has been left at an end of the polyester polyol, epoxy compounds can also be used as curing agents. Examples of epoxy compounds include bisphenol A diglycidyl ether and its oligomers, hydrogenated bisphenol A diglycidyl ether and its oligomers, diglycidyl orthophthalate, diglycidyl isophthalate, diglycidyl terephthalate, diglycidyl p-hydroxybenzoic acid, diglycidyl tetrahydrophthalate, diglycidyl hexahydrophthalate, diglycidyl succinate, diglycidyl adipate, diglycidyl sebacate, ethylene glycol diglycidyl ether, propylene glycol diglycidyl ether, 1,4-butanediol diglycidyl ether, 1,6-hexanediol diglycidyl ether, and polyalkylene glycol diglycidyl ethers, triglycidyl trimellitate, triglycidyl isocyanurate, 1,4-diglycidyloxybenzene, diglycidylpropyleneurea, glycerol triglycidyl ether, trimethylolethane triglycidyl ether, trimethylolpropane triglycidyl ether, pentaerythritol tetraglycidyl ether, and triglycidyl ethers of glycerol alkylene oxide adducts.

The percentages of the polyester polyol and the curing agent are preferably so that the ratio of the equivalent weights of the hydroxyl groups of the polyester polyol to the reactive component of the curing agent is between 1/0.5 and 1/5. The ratio of equivalent weights is more preferably between 1/1 and 1/3. A ratio of equivalent weights falling within these ranges results in a lower possibility of surplus curing agent component being left unused and as a consequence the curing agent component bleeding out of the adhesive layer after bonding, and also ensures that the resin composition can exhibit sufficient adhesiveness.

A resin composition in an embodiment may further contain a modifier. Examples of modifiers include a coupling agent, a silane compound, and an acid anhydride. If the resin composition contains any such modifier, the smectite with partially immobilized lithium is improved in wettability and therefore in dispersibility in the resin composition. One modifier may be used alone, or multiple modifiers may be used in combination.

Examples of coupling agents include known and commonly used ones, such as silane coupling agents, titanium coupling agents, zirconium coupling agents, and aluminum coupling agents.

Examples of silane coupling agents that can be used include known and commonly used ones, e.g., epoxy-containing silane coupling agents, such as 3-glycidoxypropyltrimethoxysilane, 3-glycidoxypropyltriethoxysilane, 3-glycidoxypropylmethyldiethoxysilane, and 2-(3,4 epoxycyclohexyl)ethyltrimethoxysilane; amino-containing silane coupling agents, such as 3-aminopropyltrimethoxysilane, N-2-(aminoethyl)-3-aminopropylmethyldimethoxysilane, 3-triethoxysilyl-N-(1,3-dimethylbutylidene)propylamine, and N-phenyl-γ-aminopropyltrimethoxysilane; (meth) acryloyl-containing silane coupling agents, such as 3-acryloxypropyltrimethoxysilane, 3-methacryloxypropyltrimethoxysilane, and 3-methacryloxypropyltriethoxysilane; and isocyanate-containing silane coupling agents, such as 3-isocyanatopropyltriethoxysilane.

Examples of titanium coupling agents include isopropyl triisostearoyl titanate, isopropyl trioctanoyl titanate, isopropyl dimethacrylisostearoyl titanate, isopropyl isostearoyl diacryltitanate, isopropyl tris(dioctyl pyrophosphate) titanate, tetraoctyl bis(ditridecyl phosphite) titanate, tetra(2,2-diallyloxymethyl-1-butyl) bis(ditridecyl)phosphite titanate, bis(dioctyl pyrophosphate)oxyacetate titanate, and bis(dioctyl pyrophosphate)ethylene titanate.

Examples of zirconium coupling agents include zirconium acetate, ammonium zirconium carbonate, and zirconium fluoride.

Examples of aluminum coupling agents include acetalkoxyaluminum diisopropylate, aluminum diisopropoxymonoethylacetoacetate, aluminum tris ethylacetoacetate, and aluminum tris acetylacetonate.

The amount of coupling agents (coupling agent loading) is preferably 0.1% by mass or more, more preferably 0.3% by mass or more, even more preferably 0.5% by mass or more, in particular 3.0% by mass or more of the total mass of fillers. A loading equal to or more than 0.1% by mass helps the resin composition produce its effect of improving the dispersibility of fillers in the resin. The amount of coupling agents (coupling agent loading) is preferably 50% by mass or less, more preferably 30% by mass or less, even more preferably 15% by mass or less of the total mass of fillers. An amount (loading) equal to or lower than 50% by mass results in reduced impact of the coupling agent(s) on the mechanical characteristics of the resin composition. Given these, the amount of coupling agents (coupling agent loading) is preferably between 0.1% and 50% by mass, more preferably between 0.3% and 30% by mass, even more preferably between 0.5% and 15% by mass, in particular between 3% and 15% by mass of the total mass of fillers.

Examples of silane compounds include alkoxysilanes, silazanes, and siloxanes. Examples of alkoxysilanes include methyltrimethoxysilane, dimethyldimethoxysilane, phenyltrimethoxysilane, methyltriethoxysilane, dimethyldiethoxysilane, phenyltriethoxysilane, n-propyltrimethoxysilane, n-propyltriethoxysilane, hexyltrimethoxysilane, hexyltriethoxysilane, octyltriethoxysilane, decyltrimethoxysilane, and 1,6-bis(trimethoxysilyl)hexane, trifluoropropyltrimethoxysilane. An example of a silazane is hexamethyldisilazane. An example of a siloxane is a siloxane that contains a hydrolyzable group.

Examples of acid anhydrides include phthalic anhydride, succinic anhydride, het anhydride, himic anhydride, maleic anhydride, tetrahydrophthalic anhydride, methyltetrahydrophthalic anhydride, hexahydrophthalic anhydride, methylhexahydrophthalic anhydride, methylnadic anhydride, alkenylsuccinic anhydrides, tetrabromophthalic anhydride, tetrachlorophthalic anhydride, trimellitic anhydride, pyromellitic anhydride, benzophenonetetracarboxylic anhydride, 2,3,6,7-naphthalenetetracarboxylic dianhydride, 5-(2,5-oxotetrahydrofuryl)-3-methyl-3-cyclohexene-1,2-dicarboxylic anhydride, and styrene maleic anhydride copolymers.

The amount of modifiers is preferably between 0.1% and 50% by mass of the whole amount of the smectite with partially immobilized lithium. An amount of modifiers equal to or higher than 0.1% by mass results in better dispersibility of the smectite with partially immobilized lithium in the resin composition. An amount of modifiers equal to or lower than 50% by mass results in reduced impact of the modifier(s) on the mechanical characteristics of the resin composition. The amount of modifiers is preferably between 0.3% and 30% by mass, more preferably between 0.5% and 15% by mass.

(Solvent)

A resin composition in an embodiment may contain a solvent, depending on its purpose of use. The solvent can be an organic solvent for example, such as methyl ethyl ketone, acetone, ethyl acetate, butyl acetate, toluene, dimethylformamide, acetonitrile, methyl isobutyl ketone, methanol, ethanol, isopropyl alcohol, diacetone alcohol, methoxypropanol, cyclohexanone, methyl cellosolve, ethyl diglycol acetate, or propylene glycol monomethyl ether acetate. The solvent and its quantity can be selected as appropriate for the purpose of use.

(Additives)

A resin composition in an embodiment may contain additives (excluding compounds that meet the definition of a polyester polyol, a smectite with partially immobilized lithium, a curing agent, or a modifier) unless its gas barrier properties are lost. Examples of additives include organic fillers, inorganic fillers, stabilizers (antioxidant, heat stabilizer, ultraviolet absorber, etc.), plasticizers, antistatic agents, lubricants, anti-blocking agents, coloring agents, nucleators, oxygen scavengers (compounds capable of trapping oxygen), and tackifiers. These additives are be used alone, or two or more are used in combination.

Inorganic fillers as a type of additive include inorganic substances, such as metals, metal oxides, resins, and minerals, and composites thereof. Specific examples of inorganic fillers include silica, alumina, titanium, zirconia, copper, iron, silver, mica, talc, aluminum flakes, glass flakes, and clay minerals. Among these, it is particularly preferred to use a clay mineral for the purpose of improving gas barrier properties. Among clay minerals, the use of a swellable inorganic layer compound, in particular, is more preferred.

Examples of swellable inorganic layer compounds include silicate hydrates (e.g., phyllosilicate minerals), kaolinite clay minerals (e.g., halloysite), smectite clay minerals (e.g., montmorillonite, beidellite, nontronite, saponite, hectorite, sauconite, and stevensite), and vermiculite clay minerals (e.g., vermiculite). These minerals may be natural or synthesized clay minerals. Swellable inorganic layer compounds are used alone, or two or more are used in combination.

Examples of compounds capable of trapping oxygen include low-molecular-weight organic compounds that react with oxygen, such as hindered phenolic compounds, vitamin C, vitamin E, organic phosphorus compounds, gallic acid, and pyrogallol, and compounds of transition metals, such as cobalt, manganese, nickel, iron, and copper.

Examples of tackifiers include xylene resins, terpene resins, and rosin resins. Adding a tackifier helps improve adhesion to film materials upon application. The amount of tackifier added is preferably between 0.01 and 5 parts by mass based on the whole amount of the resin composition as 100 parts by mass.

<Molding Method>

A molded article according to an embodiment is a molded article obtained by molding a resin composition as described above. The molded article may be from the cured form of the resin composition. The molding method can be a known and commonly used method and can be selected in accordance with the purpose of use when appropriate. The molded article can be in any shape; it may be shaped like a plate, may be shaped like a sheet, or may be shaped like film. The molded article may have a three-dimensional shape, may be a coating on a substrate, or may be one molded to be present between a substrate and a substrate.

If a plate- or sheet-shaped article is fabricated, possible methods include methods in which the resin composition is molded, for example using extrusion molding, flat stamping, profile extrusion molding, blow molding, compression molding, vacuum molding, or injection molding. If a film-shaped article is fabricated, examples of possible methods include hot melt extrusion, polymer solution casting, inflation film molding, cast molding, extrusion laminating, calender molding, sheet forming, fiber molding, blow molding, injection molding, rotational molding, and coating. In the case of a resin that cures when exposed to, for example, heat or active energy radiation, the molded article can be fabricated using curing methods in which heat or active energy radiation is employed.

If the resin composition is liquid, it may be molded by coating. Examples of possible coating methods include spraying, spin coating, dipping, roll coating, blade coating, doctor roll coating, doctor blading, curtain coating, slit coating, screen printing, inkjet coating, and dispensing.

A laminate according to an embodiment is one that has a molded article as described above on a substrate. That is, the laminate includes a substrate and a molded article as described above on the substrate. The laminate may have a two-layer structure, a three-layer structure, or have more layers.

The material for the substrate is not critical and can be selected as appropriate for the purpose of use. The substrate can be made of, for example, wood, metal, plastic, paper, silicone, or a modified silicone or may be a substrate obtained by joining different materials together. The substrate can be in any shape; it may be shaped like a flat plate, a sheet, a three-dimensional shape having curvature throughout or in part of it, or any other shape selected in accordance with the purpose. The hardness, thickness, etc., of the substrate are not critical either.

The laminate can be obtained by laminating the substrate with a molded article as described above. The molded article with which the substrate is laminated may be formed by directly coating the substrate with the resin composition or molding the resin composition directly on the substrate. For direct coating, the coating method is not critical, and examples of possible methods include spraying, spin coating, dipping, roll coating, blade coating, doctor roll coating, doctor blading, curtain coating, slit coating, screen printing, and inkjet coating. For direct molding, examples of possible molding methods include in-mold forming, film insert molding, vacuum molding, extrusion laminating, and stamping. If an article molded from the resin composition is placed, a layer of uncured or partially cured resin composition may be placed on the substrate and then cured, or a layer of completely cured resin composition may be placed on the substrate.

Alternatively, the laminate may be obtained by coating cured resin composition with a precursor to the substrate and then curing the precursor or may be obtained by bonding together a precursor to the substrate and the resin composition with one of them uncured or partially cured and then curing the uncured or partially cured member. The precursor to the substrate can be any substance, and examples include curable resin compositions. The laminate may be fabricated by using a resin composition according to an embodiment as an adhesive.

The resin composition is suitable for use as a gas barrier material by virtue of being superior in water vapor and oxygen barrier properties.

The resin composition is suitable for use as a coating material. The coating material only needs to be one that contains a resin composition as described above. The method of coating with the coating material is not critical. Examples of specific methods include coating methods such as roll coating and gravure coating. The coater is not critical either. By virtue of having high gas barrier properties, the resin composition can be suitably used as a coating material for gas barrier purposes.

The resin composition is suitable for use as an adhesive by virtue of being superior in adhesiveness. The adhesive can be in any form; it may be a liquid or paste adhesive or may be a solid adhesive. By virtue of having high gas barrier properties, the resin composition can be suitably used as an adhesive for gas barrier purposes.

A liquid or paste adhesive may be a one-component adhesive or may be a two-component adhesive, an adhesive that comes with a separate curing agent. It is not critical how the liquid or paste adhesive is used, but the user may apply it to the surface to be bonded or pour it between the surfaces to be bonded, join the members together, and cure the adhesive.

In the case of a solid adhesive, the user may place a powder, chip, or sheet shaped from the adhesive between the surfaces to be bonded, join the surfaces together by thermally melting the adhesive, and cure the adhesive.

EXAMPLES

The following describes the present invention in further detail by examples and comparative examples, but the present invention is not limited to these. In the examples, "parts" and "%" are by mass unless otherwise specified.

<Measurement of the Number-Average Molecular Weight of Resins>

A sample for measurement was prepared by diluting the resin with tetrahydrofuran (THE) by a factor of 50 and filtering the dilution through a filter (material, polytetrafluoroethylene; pore size, 0.2 µm). Then this sample for measurement was supplied to a gel permeation chromatograph (GPC, Tosoh Corporation, trade name "HLC-8220GPC"), and measurement was performed under the conditions of a sample flow rate of 1 milliliter/min and a column temperature of 40° C. The measured polystyrene-equivalent molecular weight of the resin was reported as the number-average molecular weight of the resin. In the GPC measurement, the columns were HXL-X, G5000HXL, G3000HXL, G2000HXL, and G2000HXL (all available from Tosoh Corporation), and the detector was a differential refractometer.

<Measurement of Acid Value>

The measurement of acid value in the Examples and the Comparative Examples followed the measuring method for acid value set forth in JIS-K0070.

<Measurement of Hydroxyl Value>

The measurement of hydroxyl value in the Examples and the Comparative Examples followed the measuring method for hydroxyl value set forth in JIS-K0070.

(Production Example 1) Example of the Production of Resin (A)

A polyester reactor equipped with a stirrer, a nitrogen gas tube, a reflux distillation column, a water separator, etc., was charged with 500 parts of 4-methylhexahydrophthalic anhydride (RIKACID MH, New Japan Chemical Co., Ltd.), 269.54 parts of ethylene glycol, and titanium tetraisopropoxide. The titanium tetraisopropoxide was added in an amount such that it would be 100 ppm of the total amount of polyfunctional carboxylic acids and polyhydric alcohols. The reactor was heated to keep the internal temperature at 220° C., but slowly so that the temperature of the upper reflux distillation column would not exceed 100° C. The esterification was terminated when the acid value fell below 2 mg KOH/g. In this way, "resin (A)," a polyester polyol having an acid value of 0.6 mg KOH/g, a hydroxyl value of 183 mg KOH/g, and a number-average molecular weight of 612, was obtained. In this polyester polyol, the percentage use of ortho-oriented aromatic dicarboxylic acids and their anhydrides in the entire polyfunctional carboxylic acid component is 0%.

(Production Example 2) Production of Resin (B): A Polyester Polyol Formed by Glycerol, Ethylene Glycol, and Orthophthalic Acid A polyester reactor equipped with a stirrer, a nitrogen gas tube, a reflux distillation column, a water separator, etc., was charged with 276.27 parts of glycerol, 740.7 parts of phthalic anhydride, 715.09 parts of ethylene glycol, and 0.19 parts of titanium tetraisopropoxide. The reactor was heated to keep the internal temperature at 220° C., but slowly so that the temperature of the upper reflux distillation column would not exceed 100° C. The esterification was terminated when the acid value fell below 1 mg KOH/g. In this way, "resin (B)," a polyester polyol having an acid value of 1.0 mg KOH/g, a hydroxyl value of 213 mg KOH/g, and a number-average molecular weight of 2380, was obtained. In this polyester polyol, the percentage use of ortho-oriented aromatic dicarboxylic acids and their anhydrides in the entire polyfunctional carboxylic acid component is 100%, and the molar ratio between glycerol and ethylene glycol is 1:0.71.

(Production Example 3) Production of Resin (C): A Polyester Polyol Formed by Glycerol, Ethylene Glycol, and Orthophthalic Acid A polyester reactor equipped with a stirrer, a nitrogen gas tube, a reflux distillation column, a water separator, etc., was charged with 234.24 parts of glycerol, 555.01 parts of ethylene glycol, 1280.97 parts of phthalic anhydride, and 0.20 parts of titanium tetraisopropoxide. The reactor was heated to keep the internal temperature at 220° C., but slowly so that the temperature of the upper reflux distillation column would not exceed 100° C. The esterification was terminated when the acid value fell below 1 mg KOH/g. In this way, "resin (C)," a polyester polyol having an acid value of 1.0 mg KOH/g, a hydroxyl value of 194 mg KOH/g, and a number-average molecular weight of 578, was obtained. In this polyester polyol, the percentage use of ortho-oriented aromatic dicarboxylic acids and their anhydrides in the entire polyfunctional carboxylic acid component is 100%, and the molar ratio between glycerol and ethylene glycol is 1:3.

(Production Example 4) Production of Resin (D): A Polyester Polyol Formed by Glycerol and Orthophthalic Acid A polyester reactor equipped with a stirrer, a nitrogen gas tube, a reflux distillation column, a water separator, etc., was charged with 493.7 parts of glycerol and 756.3 parts of phthalic anhydride. The reactor was heated to keep the internal temperature at 190° C., but slowly so that the temperature of the upper reflux distillation column would not exceed 100° C. Then 135.3 parts of phthalic anhydride was added when the acid value fell below 40 mg KOH/g, and the esterification was terminated when the acid value fell below 75 mg KOH/g. In this way, "resin (D)," a polyester polyol having an acid value of 70.9 mg KOH/g, a hydroxyl value of 173 mg KOH/g, and a number-average molecular weight of 649, was obtained. In this polyester polyol, the percentage use of ortho-oriented aromatic dicarboxylic acids and their anhydrides in the entire polyfunctional carboxylic acid component is 100%.

(Production Example 5) Production of Resin (E): A Polyester Polyol Formed by Ethylene Glycol, Orthophthalic Acid and Adipic Acid A polyester reactor equipped with a stirrer, a nitrogen gas tube, a reflux distillation column, a water separator, etc., was charged with 702 parts of ethylene glycol, 912.2 parts of phthalic anhydride, 385.7 parts of adipic acid, and 0.14 parts of titanium tetraisopropoxide. The reactor was heated to keep the internal temperature at 220° C., but slowly so that the temperature of the upper reflux distillation column would not exceed 100° C. The esterification was terminated when the acid value fell below 1 mg KOH/g. In this way, "resin (E)," a polyester polyol having an acid value of 1.0 mg KOH/g, a hydroxyl value of 140 mg KOH/g, and a number-average molecular weight of 803.4, was obtained. In this polyester polyol, the molar ratio between phthalic anhydride and adipic acid is 7:3, and the percentage use of ortho-oriented aromatic dicarboxylic acids and their anhydrides in the entire polyfunctional carboxylic acid component is 70%.

(Production Example 6) Production of Resin (F): A Polyester Polyol Formed by Ethylene Glycol and Orthophthalic Acid A polyester reactor equipped with a stirrer, a nitrogen gas tube, a reflux distillation column, a water separator, etc., was charged with 714.12 parts of glycerol and 1285.88 parts of phthalic anhydride. The reactor was heated to keep the internal temperature at 220° C., but slowly so that the temperature of the upper reflux distillation column would not exceed 100° C. The esterification was terminated when the acid value fell below 1 mg KOH/g. In this way, "resin (F)," a polyester polyol having an acid value of 1.0 mg KOH/g, a hydroxyl value of 126 mg KOH/g, and a number-average molecular weight of 891, was obtained. In this polyester polyol, the percentage use of ortho-oriented aromatic dicarboxylic acids and their anhydrides in the entire polyfunctional carboxylic acid component is 100%.

<Preparation of Fillers>

As the fillers to be contained in the resin compositions, the following smectites with partially immobilized lithium and smectite without partially immobilized lithium were prepared.

(Smectites with Partially Immobilized Lithium)
  Montmorillonite liquid dispersion A, Kunimine Industries Co., Ltd. (cation exchange capacity (CEC) of montmorillonite, 39.0 meq/100 g; solids content, 20% by mass)
  Montmorillonite liquid dispersion B, Kunimine Industries Co., Ltd. (cation exchange capacity (CEC) of montmorillonite, 24.5 meq/100 g; solids content, 20% by mass)
  Montmorillonite liquid dispersion C, Kunimine Industries Co., Ltd. (cation exchange capacity (CEC) of montmorillonite, 59.2 meq/100 g; solids content, 20% by mass)

(Smectite without Partially Immobilized Lithium)
  Natural montmorillonite (trade name, KUNIPIA-F; cation exchange capacity (CEC) of montmorillonite, 108 meq/100 g; Kunimine Industries Co., Ltd.)

Example 1

To 100 parts of resin (A), obtained in Production Example 1, 110 parts of montmorillonite liquid dispersion A, 300 parts of acetone, 93 parts of 2-propanol, and 79 parts of a silane coupling agent solution formed by 1.5 parts of 3-methacryloxypropyltrimethoxysilane (trade name, KBM-503; Shin-Etsu Chemical Co., Ltd.), 0.4 parts of water, 77 parts of 2-propanol, and 0.1 parts of 0.1 mol/l hydrochloric acid and stirred for 2 hours beforehand were added. The materials were kept under stirring for 8 hours. In this way, a liquid coating of Example 1 was obtained. A 12-μm PET film ("E-5100," Toyobo Co., Ltd.) was coated with the resulting liquid coating using a bar coater on its corona-treated surface to a dry coating thickness of 2 μm and, shorty after coating, heated in a drying oven at 120° C. for 1 minute. The film was then heated in a drying oven at 130° C. for 2 hours, giving a film laminate. In these liquid coating and film laminate, the filler content is 18% by mass of the total nonvolatile content of the resin composition, and the amount of the silane coupling agent is 5% by mass of the total mass of fillers.

Example 2

To 100 parts of resin (A), obtained in Production Example 1, 208 parts of montmorillonite liquid dispersion A, 300 parts of acetone, 64 parts of 2-propanol, and 150 parts of a silane coupling agent solution formed by 2.9 parts of 3-methacryloxypropyltrimethoxysilane (trade name, KBM-503; Shin-Etsu Chemical Co., Ltd.), 0.8 parts of water, 146.1 parts of 2-propanol, and 0.2 parts of 0.1 mol/l hydrochloric acid and stirred for 2 hours beforehand were added. The materials were kept under stirring for 8 hours. Then 122 parts of TMP-XDI (xylylene diisocyanate-trimethylolpropane adduct; trade name, TAKENATE D-110N; Mitsui Chemicals; solids content, 75% by mass) was added. In this way, a liquid coating of Example 2 was obtained. A film laminate was obtained as in Example 1 except that the resulting liquid coating was used. In these liquid coating and film laminate, the filler content is 18% by mass of the total nonvolatile content of the resin composition, and the amount of the silane coupling agent is 5% by mass of the total mass of fillers.

Example 3

To 100 parts of a resin solution obtained by diluting resin (B), obtained in Production Example 2, with methyl ethyl ketone (MEK) to a solids content of 75% by mass, 160 parts of montmorillonite liquid dispersion A, 288 parts of acetonitrile, 32 parts of water, 64 parts of 2-propanol, and 70.8 parts of a silane coupling agent solution formed by 4.8 parts of 3-methacryloxypropyltrimethoxysilane (trade name, KBM-503; Shin-Etsu Chemical Co., Ltd.), 1.3 parts of water, 32 parts of 2-propanol, and 0.7 parts of 0.1 mol/1 hydrochloric acid and stirred for 2 hours beforehand were added. The materials were kept under stirring for 8 hours. Then 95 parts of TMP-XDI (xylylene diisocyanate-trimethylolpropane adduct; trade name, TAKENATE D-110N; Mitsui Chemicals; solids content, 75% by mass) was added. In this way, a liquid coating of Example 3 was obtained. A film laminate was obtained as in Example 1 except that the resulting liquid coating was used. In these liquid coating and film laminate, the filler content is 18% by mass of the total nonvolatile content of the resin composition, and the amount of the silane coupling agent is 11% by mass of the total mass of fillers.

Example 4

A liquid coating of Example 4 was obtained as in Example 3 except that the silane coupling agent solution was not used and that the amounts of each ingredient were changed as in Table 1. A film laminate of Example 4 was obtained as in Example 1 except that the resulting liquid coating was used.

Examples 5 to 9

Liquid coatings of Examples 5 to 9 were each obtained as in Example 3 except that the formula of the silane coupling agent solution and the amounts of each ingredient were changed as in Table 1. Film laminates of Examples 5 to 9 were each obtained as in Example 1 except that the resulting liquid coatings were used.

Examples 10 and 11

Liquid coatings of Examples 10 and 11 were each obtained as in Example 3 except that the solvent water was not used and that the formula of the silane coupling agent solution and the amounts of each ingredient were changed as in Table 1. Film laminates of Examples 10 and 11 were each obtained as in Example 1 except that the resulting liquid coatings were used.

Examples 12 to 15

Liquid coatings of Examples 12 to 15 were each obtained as in Example 3 except that the 3-methacryloxypropyltrimethoxysilane as the silane coupling agent component of the silane coupling agent solution was replaced with 3-glycidoxypropyltriethoxysilane (trade name, KBM-403; Shin-Etsu Chemical Co., Ltd.) or n-propyltrimethoxysilane (trade name, KBM-3033; Shin-Etsu Chemical Co., Ltd.) and that the amounts of each ingredient were changed as in Table 2. Film laminates of Examples 12 to 15 were each obtained as in Example 1 except that the resulting liquid coatings were used.

Examples 16 and 17

Liquid coatings of Examples 16 and 17 were each obtained as in Example 3 except that the solvents were changed, that the curing agent TMP-XDI was replaced with TMP-TDI (tolylene diisocyanate-trimethylolpropane adduct; trade name, KW-75; DIC Corporation; solids content, 75% by mass) or m-XDI (metaxylylene diisocyanate; trade name, TAKENATE 500; Mitsui Chemicals, Inc.) and that the amounts of each ingredient were changed as in Table 2. Film laminates of Examples 16 and 17 were each obtained as in Example 1 except that the resulting liquid coatings were used.

Examples 18 and 19

Liquid coatings of Examples 18 and 19 were each obtained as in Example 3 except that the silane coupling agent solution was replaced with PLENACT 41B (Ajinomoto Fine-Techno Co., Inc., trade name) or LS-7150 TMP-TDI (Shin-Etsu Chemical Co., Ltd.), trade name, hexamethyldisilazane) and that the amounts of each ingredient were changed as in Table 2. Film laminates of Examples 18 and 19 were each obtained as in Example 1 except that the resulting liquid coatings were used.

Examples 20 and 21

Liquid coatings of Examples 20 and 21 were each obtained as in Example 3 except that montmorillonite liquid dispersion A was replaced with montmorillonite liquid dispersion B or C. Film laminates of Examples 20 and 21 were each obtained as in Example 1 except that the resulting liquid coatings were used.

Examples 22 to 25

Liquid coatings of Examples 22 to 25 were each obtained as in Example 3 except that resin (B) was replaced with resin (C), (D), (E), or (F), obtained in Production Examples 3 to 6, and that the amounts of each ingredient were changed as in Table 3. Film laminates of Examples 22 to 25 were each obtained as in Example 1 except that the resulting liquid coatings were used.

Comparative Example 1

To 100 parts of resin (A), obtained in Production Example 1, 213 parts of acetone was added. The materials were stirred for 1 hour. Then 121 parts of TMP-XDI (xylylene diisocyanate-trimethylolpropane adduct; trade name, TAKENATE D-110N; Mitsui Chemicals) was added. In this way, a liquid coating of Comparative Example 1 was obtained. A film laminate was obtained as in Example 1 except that the resulting liquid coating was used.

Comparative Example 2

To 300 parts of a resin solution obtained by diluting resin (B), obtained in Production Example 2, with methyl ethyl ketone to a solids content of 25% by mass, 93 parts of TMP-XDI (xylylene diisocyanate-trimethylolpropane adduct; trade name, TAKENATE D-110N; Mitsui Chemicals) was added. In this way, a liquid coating of Comparative Example 2 was obtained. A film laminate of Comparative Example 2 was obtained as in Example 1 except that the resulting liquid coating was used.

Comparative Example 3

A liquid coating of Comparative Example 3 was obtained as in Comparative Example 2 except that the resin solution was kept under stirring with 30.9 parts of natural montmorillonite for 8 hours before the addition of TMP-XDI. A film laminate of Comparative Example 3 was obtained as in Example 1 except that the resulting liquid coating was used.

<Barrier Properties Testing>

Using the film laminates of the Examples and Comparative Examples, the oxygen permeability and water vapor permeability of the film laminates were measured as follows. The test results are presented in Tables 1 to 3.

Oxygen Permeability:

The oxygen permeability of the film laminate was measured in atmospheres at 23° C. and 0% RH and 90% RH using MOCON OX-TRAN 1/50 oxygen transmission rate test system in accordance with JIS-K7126 (equal-pressure method). RH stands for humidity.

Water Vapor Permeability:

The water vapor permeability of the film laminate was measured in an atmosphere at 40° C. and 90% RE using a dish for water vapor permeation testing in accordance with "Testing Methods for Determination of the Water Vapour Transmission Rate of Moisture-Proof Packaging Materials," JIS Z 0208.

TABLE 1

| | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Resin solution | Resin (A) | 100 | 100 | — | — | — | — | — | — | — | — | — |
| | Resin (B) | — | — | 75 | 75 | 75 | 75 | 75 | 75 | 75 | 75 | 75 |
| | Resin (C) | — | — | — | — | — | — | — | — | — | — | — |
| | Resin (D) | — | — | — | — | — | — | — | — | — | — | — |
| | Resin (E) | — | — | — | — | — | — | — | — | — | — | — |
| | Resin (F) | — | — | — | — | — | — | — | — | — | — | — |
| | MEK | — | — | 25 | 25 | 25 | 25 | 25 | 25 | 25 | 25 | 30.5 |
| | Ethyl acetate | — | — | — | — | — | — | — | — | — | — | — |
| Fillers | Montmorillonite liquid dispersion A | 110 | 208 | 160 | 160 | 160 | 160 | 38.5 | 81.5 | 314 | 732 | 1577 |
| | Montmorillonite liquid dispersion B | — | — | — | — | — | — | — | — | — | — | — |
| | Montmorillonite liquid dispersion C | — | — | — | — | — | — | — | — | — | — | — |
| | KUNIPIA-F | | | | | | | | | | | |

TABLE 1-continued

|  |  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Solvents | Acetone | 300 | 300 | — | — | — | — | — | — | — | — | — |
|  | 2-Propanol | 93 | 64 | 64 | 64 | 64 | 64 | 64 | 64 | 128 | 35 | 296 |
|  | Acetonitrile | — | — | 288 | 288 | 288 | 288 | 288 | 288 | 576 | 285 | 1281 |
|  | Water | — | — | 32 | 32 | 32 | 32 | 32 | 32 | 64 | — | — |
| Coupling solution | KBM-503 | 1.5 | 2.9 | 4.8 | — | 0.45 | 2.2 | 0.54 | 1.14 | 4.39 | 10.24 | 21.9 |
|  | KBM-403 | — | — | — | — | — | — | — | — | — | — | — |
|  | KBM-3033 | — | — | — | — | — | — | — | — | — | — | — |
|  | PLENACT 41B | — | — | — | — | — | — | — | — | — | — | — |
|  | LS-7150 | — | — | — | — | — | — | — | — | — | — | — |
|  | Water | 0.4 | 0.8 | 1.3 | — | 0.13 | 0.6 | 0.15 | 0.33 | 1.27 | 2.96 | 5.8 |
|  | 2-Propanol | 77 | 146.1 | 32 | — | 2.1 | 10.7 | 2.6 | 5.43 | 20.92 | 48.77 | 292 |
|  | 0.1 mol/l HCl | 0.1 | 0.2 | 0.7 | — | 0.08 | 0.3 | 0.07 | 0.2 | 0.77 | 1.80 | 3.4 |
| Curing agents | TMP-XDI | — | 122 | 95 | 95 | 95 | 95 | 95 | 95 | 95 | 95 | 95 |
|  | TMP-TDI | — | — | — | — | — | — | — | — | — | — | — |
|  | m-XDI | — | — | — | — | — | — | — | — | — | — | — |
| Filler content (% by mass) |  | 18 | 18 | 18 | 18 | 18 | 18 | 5 | 10 | 30 | 50 | 70 |
| Coupling agent content (% by mass/filler) |  | 5 | 5 | 11 | — | 1 | 5 | 5 | 5 | 5 | 5 | 5 |
| Oxygen permeability 0% RH (cc/m² · day · atm) |  | 16 | 8 | 3 | 1 | 1 | 2 | 4 | 2 | 3 | 0 | 2 |
| Oxygen permeability 90% RH (cc/m² · day · atm) |  | 34 | 22 | 3 | 32 | 15 | 10 | 14 | 11 | 12 | 11 | 12 |
| Water vapor permeability (g/m² · day) |  | 24 | 18 | 8 | 8 | 8 | 8 | 12 | 9 | 6 | 11 | 15 |

TABLE 2

|  |  | Example 12 | Example 13 | Example 14 | Example 15 | Example 16 | Example 17 | Example 18 | Example 19 | Example 20 | Example 21 |
|---|---|---|---|---|---|---|---|---|---|---|---|
| Resin solution | Resin (A) | — | — | — | — | — | — | — | — | — | — |
|  | Resin (B) | 75 | 75 | 75 | 75 | 75 | 75 | 75 | 75 | 75 | 75 |
|  | Resin (C) | — | — | — | — | — | — | — | — | — | — |
|  | Resin (D) | — | — | — | — | — | — | — | — | — | — |
|  | Resin (E) | — | — | — | — | — | — | — | — | — | — |
|  | Resin (F) | — | — | — | — | — | — | — | — | — | — |
|  | MEK | 25 | 25 | 25 | 25 | 25 | 25 | 25 | 25 | 25 | 25 |
|  | Ethyl acetate | — | — | — | — | — | — | — | — | — | — |
| Fillers | Montmorillonite liquid dispersion A | 160 | 160 | 160 | 160 | 98 | 168 | 154 | 154 | — | — |
|  | Montmorillonite liquid dispersion B | — | — | — | — | — | — | — | — | 160 | — |
|  | Montmorillonite liquid dispersion C | — | — | — | — | — | — | — | — | — | 160 |
|  | KUNIPIA-F | — | — | — | — | — | — | — | — | — | — |
| Solvents | Acetone | — | — | — | — | — | — | — | — | — | — |
|  | 2-Propanol | 64 | 64 | 64 | 64 | — | — | 247 | 247 | 64 | 64 |
|  | Acetonitrile | 288 | 288 | 288 | 288 | 273 | 273 | 278 | 278 | 288 | 288 |
|  | Water | 32 | 32 | 32 | 32 | 30 | 30 | 31 | 31 | 32 | 32 |
| Coupling solution | KBM-503 | — | — | — | — | 1.4 | 2.3 | — | — | 4.8 | 4.8 |
|  | KBM-403 | 2.2 | 5.0 | — | — | — | — | — | — | — | — |
|  | KBM-3033 | — | — | 2.75 | 6.01 | — | — | — | — | — | — |
|  | PLENACT 41B | — | — | — | — | — | — | 0.3 | — | — | — |
|  | LS-7150 | — | — | — | — | — | — | — | 1.5 | — | — |
|  | Water | 0.6 | 1.42 | 0.79 | 1.74 | 0.3 | 0.5 | — | — | 1.3 | 1.3 |
|  | 2-Propanol | 10.7 | 23.6 | 13.1 | 29 | 61 | 61 | — | — | 32 | 32 |
|  | 0.1 mol/l HCl | 0.3 | 0.8 | 0.4 | 1 | 0.1 | 0.1 | — | — | 0.7 | 0.7 |
| Curing agents | TMP-XDI | 95 | 95 | 95 | 95 | — | — | 93 | 93 | 95 | 95 |
|  | TMP-TDI | — | — | — | — | 24 | — | — | — | — | — |
|  | m-XDI | — | — | — | — | — | 82 | — | — | — | — |
| Filler content (% by mass) |  | 18 | 18 | 18 | 18 | 18 | 18 | 18 | 18 | 18 | 18 |
| Coupling agent content (% by mass/filler) |  | 5 | 11 | 5 | 11 | 5 | 5 | 1 | 5 | 11 | 11 |
| Oxygen permeability 0% RH (cc/m² · day · atm) |  | 2 | 3 | 1 | 2 | 2 | 1 | 4 | 2 | 2 | 2 |

TABLE 2-continued

|  | Example 12 | Example 13 | Example 14 | Example 15 | Example 16 | Example 17 | Example 18 | Example 19 | Example 20 | Example 21 |
|---|---|---|---|---|---|---|---|---|---|---|
| Oxygen permeability 90% RH (cc/m² · day · atm) | 6 | 3 | 14 | 10 | 10 | 3 | 24 | 19 | 7 | 3 |
| Water vapor permeability (g/m² · day) | 7 | 6 | 7 | 8 | 8 | 4 | 15 | 16 | 11 | 7 |

TABLE 3

|  |  | Example 22 | Example 23 | Example 24 | Example 25 | Comparative Example 1 | Comparative Example 2 | Comparative Example 3 |
|---|---|---|---|---|---|---|---|---|
| Resin solution | Resin (A) | — | — | — | — | 100 | — | — |
|  | Resin (B) | — | — | — | — | — | 75 | 75 |
|  | Resin (C) | 69.7 | — | — | — | — | — | — |
|  | Resin (D) | — | 73.2 | — | — | — | — | — |
|  | Resin (E) | — | — | 100 | — | — | — | — |
|  | Resin (F) | — | — | — | 80.4 | — | — | — |
|  | MEK | — | 26.8 | — | — | — | 225 | 225 |
|  | Ethyl acetate | 30.3 | — | — | 19.6 | — | — | — |
| Fillers | Montmorillonite liquid dispersion A | 183.7 | 145 | 221.6 | 168.4 | — | — | — |
|  | Montmorillonite liquid dispersion B | — | — | — | — | — | — | — |
|  | Montmorillonite liquid dispersion C | — | — | — | — | — | — | — |
|  | KUNIPIA-F | — | — | — | — | — | — | 30.9 |
| Solvents | Acetone | — | — | — | — | 213 | — | — |
|  | 2-Propanol | 93.6 | 58 | 140.3 | 113.2 | — | — | — |
|  | Acetonitrile | 267.9 | 378 | 384.6 | 307.2 | — | — | — |
|  | Water | 29.8 | 29 | 42.7 | 34.1 | — | — | — |
| Coupling solution | KBM-503 | 2.54 | 8.7 | 3.07 | 2.33 | — | — | — |
|  | KBM-403 | — | — | — | — | — | — | — |
|  | KBM-3033 | — | — | — | — | — | — | — |
|  | PLENACT 41B | — | — | — | — | — | — | — |
|  | LS-7150 | — | — | — | — | — | — | — |
|  | Water | 0.55 | 1.16 | 0.67 | 0.51 | — | — | — |
|  | 2-Propanol | 25.4 | 58.1 | 30.7 | 23.3 | — | — | — |
|  | 0.1 mol/l HCl | 0.25 | 0.29 | 0.31 | 0.23 | — | — | — |
| Curing agents | TMP-XDI | 130.2 | 82.6 | 135.8 | 97.4 | 121 | 93 | 93 |
|  | TMP-TDI | — | — | — | — | — | — | — |
|  | m-XDI | — | — | — | — | — | — | — |
| Filler content (% by mass) |  | 18 | 18 | 18 | 18 | — | — | 18 |
| Coupling agent content (% by mass/filler) |  | 5 | 5 | 5 | 5 | — | — | — |
| Oxygen permeability 0% RH (cc/m² · day · atm) |  | 2 | 1 | 12 | 12 | 130 | 74 | 86 |
| Oxygen permeability 90% RH (cc/m² · day · atm) |  | 11 | 21 | 15 | 14 | 118 | 49 | 57 |
| Water vapor permeability (g/m² · day) |  | 10 | 13 | 21 | 18 | 48 | 43 | 43 |

INDUSTRIAL APPLICABILITY

The resin composition according to the present invention can be used in various fields, including packaging materials and also electronic materials and building materials, by virtue of being superior in gas barrier properties, in particular in water vapor barrier properties and in oxygen barrier properties under high-humidity conditions.

The invention claimed is:

1. A resin composition comprising a polyester polyol and a smectite with partially immobilized lithium, wherein the polyester polyol has a hydroxyl value of 20 to 300 mg KOH/g.

2. The resin composition according to claim 1, further comprising a curing agent.

3. The resin composition according to claim 2, wherein the curing agent is a polyisocyanate.

4. The resin composition according to claim 1, wherein the polyester polyol is a polycondensate of at least one polyfunctional carboxylic acid that includes at least one of ortho-oriented aromatic dicarboxylic acids and anhydrides thereof with a polyhydric alcohol.

5. The resin composition according to claim 1, wherein the polyester polyol has a glycerol backbone.

6. The resin composition according to claim 1, further comprising a coupling agent.

7. The resin composition according to claim 1, wherein the smectite with partially immobilized lithium has a cation exchange capacity of 1 to 70 meq/100 g.

8. The resin composition according to claim 1, wherein the smectite with partially immobilized lithium is present in an amount of 3% to 50% by mass based on total nonvolatile content of the resin composition.

9. An article molded from a resin composition according to claim 1.

10. A laminate comprising a substrate and a molded article according to claim 9 on the substrate.

11. A gas barrier material comprising a resin composition according to claim 1.

12. A coating material comprising a resin composition according to claim 1.

13. An adhesive comprising a resin composition according to claim 1.

14. A resin composition comprising a polyester polyol and a smectite with partially immobilized, wherein the smectite with partially immobilized lithium has a cation exchange capacity of 1 to 70 meq/100 g.

15. The resin composition according to claim 14, further comprising a curing agent.

16. The resin composition according to claim 14, wherein the polyester polyol has a hydroxyl value of 20 to 300 mg KOH/g.

17. An article molded from a resin composition according to claim 14.

18. A resin composition comprising a polyester polyol and a smectite with partially immobilized, wherein the polyester polyol has a glycerol backbone.

19. The resin composition according to claim 18, further comprising a curing agent.

20. An article molded from a resin composition according to claim 18.

* * * * *